May 29, 1923.

J. B. McMULLIN 1,457,180

VALVE DEVICE FOR HOSE REELS

Original Filed Aug. 13, 1919    2 Sheets-Sheet 1

J. B. McMullin, INVENTOR,

BY E. G. Siggers

ATTORNEY

WITNESSES
Howard D. Orr
F. T. Chapman.

May 29, 1923.  1,457,180

J. B. McMULLIN

VALVE DEVICE FOR HOSE REELS

Original Filed Aug. 13, 1919   2 Sheets-Sheet 2

J. B. McMullin, INVENTOR,

WITNESSES

BY

ATTORNEY

Patented May 29, 1923.

1,457,180

UNITED STATES PATENT OFFICE.

JOSEPH B. McMULLIN, OF OSKALOOSA, IOWA, ASSIGNOR TO WESTERN MANUFACTURING COMPANY, OF OSKALOOSA, IOWA.

VALVE DEVICE FOR HOSE REELS.

Original application filed August 13, 1919, Serial No. 317,294. Divided and this application filed August 17, 1920. Serial No. 404,071.

*To all whom it may concern:*

Be it known that I, JOSEPH B. McMULLIN, citizen of the United States, residing at Oskaloosa, in the county of Mahaska and State of Iowa, have invented a new and useful Valve Device for Hose Reels, of which the following is a specification.

This invention has reference to valve devices for hose reels and its object is to provide a valve structure for controlling the flow of fluid under pressure to the hose particularly for the inflation of automobile tires but is susceptible of other uses, whether the material supplied through the hose or pipe be air or other fluid or liquid.

This application is a division of my application No. 317,294, filed August 13, 1919, for a hose reel, the present application being confined to a valve structure disclosed in the aforesaid application, with the claims in this application confined to the valve structure.

The valve structure is such that when the valve is suitably actuated, cleansed air is fed to the hose for delivery to the automobile tire or other point of utilization, the delivery of air or other fluid continuing so long as may be desired.

For convenience of description it will be considered that the valve of the invention is located at an air service station for automatic action whenever it is desired to charge the inner tube of the automobile tire, and on release of the feed tube the latter is automatically retracted and the air supplied is cut off from the feeding tube or pipe.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

Figure 1:
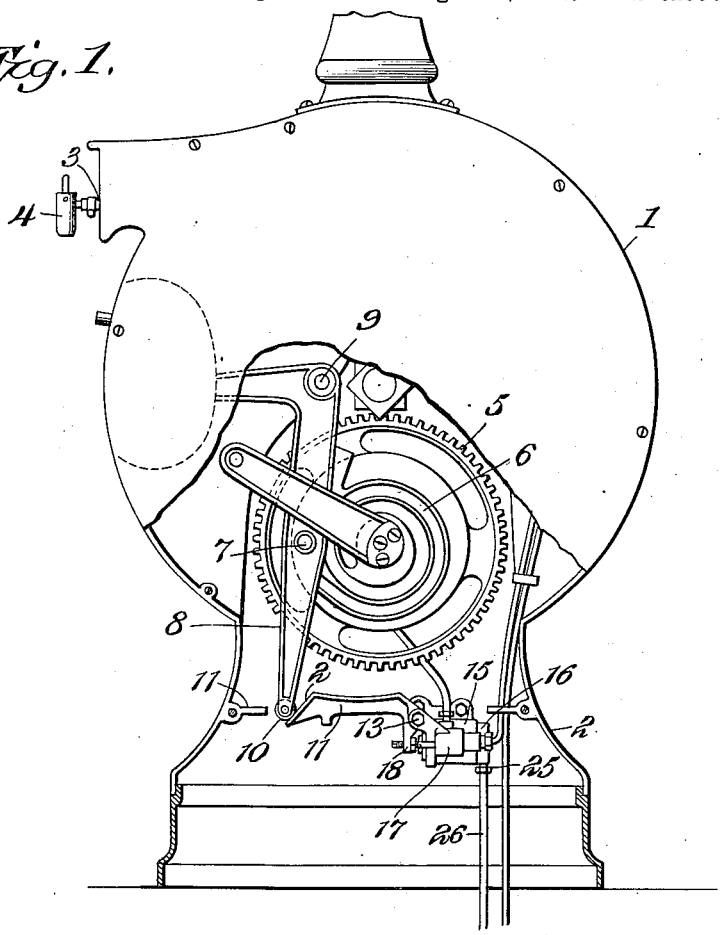
Fig. 1 is an elevation, partly broken away to disclose interior parts, of a hose reel or similar structure embodying the valve structure.
Figure 4:
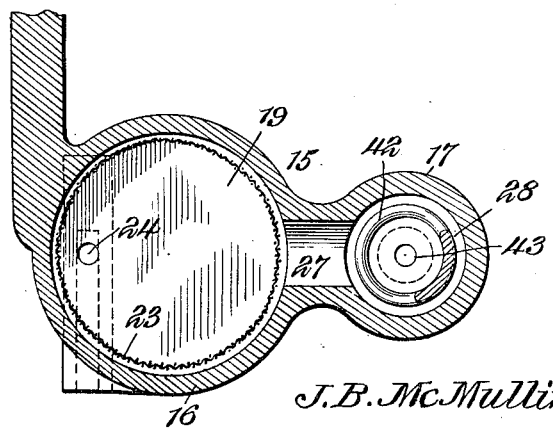
Fig. 4 is a section on the line 4—4 of Fig. 2.
Figure 2:
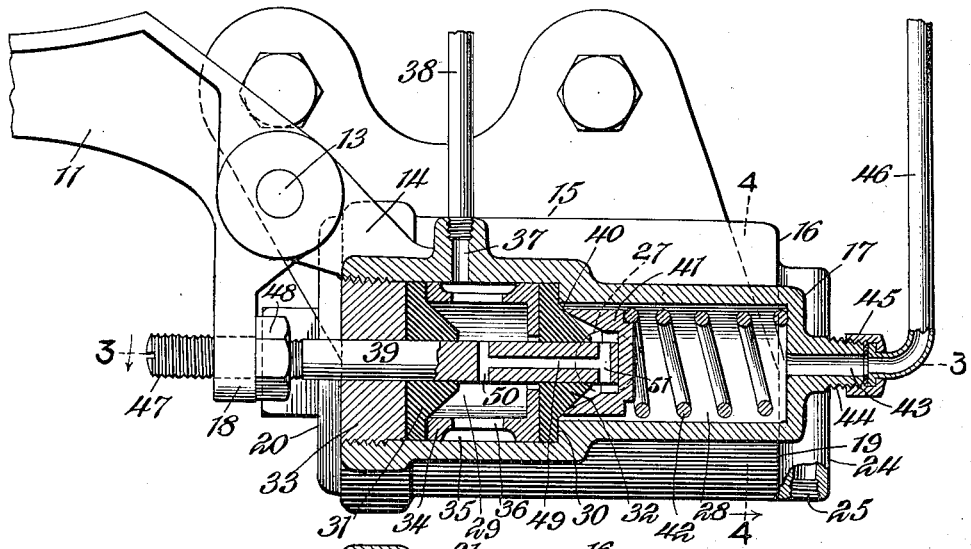
Fig. 2 is a longitudinal section on a larger scale than Fig. 1, showing the valve structure for admitting air to or cutting it off from the hose.
Figure 3:
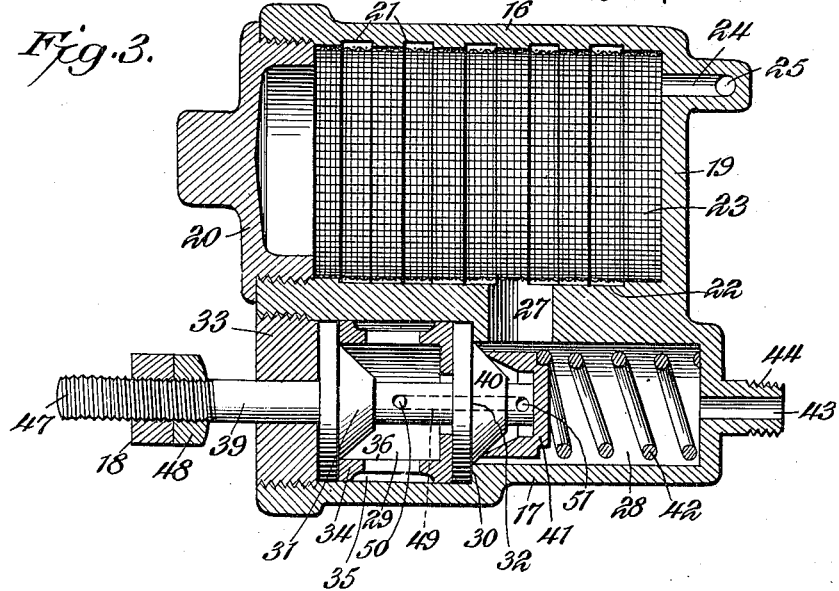
Fig. 3 is a section on the line 3—3 of Fig. 2.

Referring to the drawings there is shown in Fig. 1 a hose reel particularly designed for location at the curb line of a sidewalk, or at any other convenient point where the air hose could be located to accommodate those desiring to obtain air under pressure in order to charge or blow up automobile tires to a desirable state of pressure. Of course the air station may be located inside of a building or at any other convenient point and is suppied with an extensible hose which, in the event of the station being out of doors, is properly protected by a casing 1 mounted on a pedestal 2.

The casing 1 with its contents is shown and described in my aforesaid application and hence needs no particular description, the aforesaid application also including a showing and description of the valve structure forming the subject matter of this application and which will be particularly described herein.

The casing 1 contains an extensible and retractable hose 3 with an appropriate self-closing nozzle 4 applicable to the customary inner tube nipple of the tire.

The construction of the hose reel is neither shown nor described in detail herein since such detail showing and description occurs in the aforesaid application.

By means of suitable gearing, of which only one gear wheel 5 is indicated, a constant tendency is imparted to the hose 3 to retract into the casing 1, and an initial tension is placed upon the hose so that even when fully withdrawn the hose is held within the casing against any liability to move outwardly from the casing except under a superior force applied to the hose.

The gear wheel 5 is provided with a spiral groove 6 in which there is engaged a pin 7 fast to a lever arm 8 about midway of its length, although such particular location is not obligatory. At one end the arm 8 is carried by a fulcrum pin 9 and at the other end is provided with an anti-friction roller 10 having a stop pin 11$^a$ at one side in its path of traveling so that the lever arm is limited by the pin in the corresponding direction.

When the part carrying the spiral groove 6 is rotated, which part is under the control of the hose drum, the pin 7 is propelled by the groove in the gear 5 toward a lever 11 having a bevel end 2 in the path of the anti-friction roller 10, the spiral groove 6 then moving clockwise, thus impelling the pin 7 toward the right, as shown in Fig. 1, and moving the roller 10 along the bevel surface 2 whereby to rock the arm 11 downwardly about the pivot support 13. The arm or lever 11 with its pivot support 13 is carried upon a bracket 14 on one end of a cylinder casting 15 having two cylinders 16 and 17 respectively.

The lever 11 is an angle lever with the bevel face 2 at the extremity of the longer arm and has a shorter arm 18 at substantially right angles.

The two cylinders 16 and 17 may form one casing and for convenience of construction and compactness are placed side by side. The cylinder 16 is permanently closed at one end by a head 19 and is closed at the other end by a screw plug 20 to permit ready access to the interior of the cylinder. The interior wall of the cylinder 16 is provided with a series of circumferential grooves 21, all joined along the side toward the cylinder 17 by a longitudinal groove 22. The grooved surface of the interior of the cylinder is covered by a cylindrical screen 23 including all the grooves 21 and at one end opening through a port 24 into a pipe connection 25 to which a pipe 26 is made fast and which pipe is intended to, and may be assumed to be, connected to a source of air under pressure such as provided at the usual air stations.

The cylinder 16 is connected to the cylinder 17 by a port or passage 27 intermediate of the length of the cylinder. The cylinder 17 is divided into two chambers 28 and 29 with the chamber 29 of some greater diameter than the chamber 28, thereby providing a shoulder 30 between those two chambers. Within the cylinder 17 are two packing members 31, 32 respectively. The packing member 32, which may be formed of a rubber washer, is lodged against the shoulder 30 and the packing member 31 is lodged against a screw plug 33 forming a closure of the corresponding end of the chamber 29. The two washers 31 and 32 are separated by a spacing sleeve 34 which also serves in connection with the plug 33 and shoulder 30 to tightly lodge the two washers in the chamber 29 against the possibility of leakage past them. The spacing sleeve 34 has an exterior circumferential groove 35 and this groove is connected at intervals with the interior of the sleeve by passages or ports 36 so that the interior of the sleeve has free communication with the groove 35. Through the wall of the chamber is a port or passage 37 with which there communicates a pipe 38 ultimately connected to a suitable part of the hose reel structure whereby to conduct air thereto.

Extending through the plug 33 is a rod 39 also extending through the packing washers 31 and 32 into the chamber 28 with which the port 27 communicates. The washer 32 has a conical face 40 forming a valve seat for a valve 41 engaged by the neighboring end of the rod 39. The valve 41 is constantly urged toward the valve seat by a compression spring 42 between the valve and the inner wall of the chamber 28 remote from the plug 33. The last named end of the chamber 28 has a port 43 therethrough terminating in a nipple 44 which, by means of a coupling 45, is made fast to a pipe 46 to conduct air to a part of the air system not shown in the drawing but which may be employed in connection with an air gage to indicate the air pressure used, this particular feature being shown in the aforesaid application.

The end of the rod 39 outside of the chamber 29 has a screw-threaded portion 47 carrying a nut 48 and to which the arm 18 is applied, so that with the nut 48 used as an abutment for the arm 18 of the lever 11 the rod 47 is moved through the washers 31 and 32 each time that the lever 11 is actuated in a direction to compress the spring 42 and open the valve 41.

The rod 39 adjacent to the end engaging the valve 41 has a longitudinal bore 49 with branches 50 and 51 at the opposite ends leading to the exterior of the rod. The branch 50 opens into the interior of the spacing sleeve 34. The branch 51 opens into the interior of the valve 41 which latter is suitably chambered for the purpose. Whenever the valve 41 is opened there is communication between that portion of the chamber 28 communicating with the pipe 26, and the pipe 38. In this manner air under pressure from the source of compressed air may be conducted, when the valve 41 is open, into the chamber 29 of the cylinder 17 through the screen or strainer 23, thus preventing anything but clean air from entering the chamber within the cylinder 17. This air may pass by way of the port 27 into the compartment 28 from which clean air passes by the valve 41 through the ports 49 and 50 respectively to the pipe 38 which latter finally conveys the air to the hose 3. Assuming that the hose is withdrawn from the casing 1 to a suitable extent and that the nipple 4 is applied to the valve nipple of the tire, the air is conducted into the tire in the usual manner.

While the lever 11 may be actuated or controlled in any suitable way, by hand or otherwise, a convenient means for operating the valve may include coin operated means as indicated in the aforesaid application.

When it is desired to use the hose, the latter is withdrawn from the hose reel within the casing 1 to such extent as may be desired and the outer end of the hose is applied to the inner tube nipple of the tire, the hose being preferably supplied with a tire pump connection, indicated at 4 and which may correspond to that shown, described and claimed in my application 310,144 for tire pump connection filed by me July 11, 1919.

The withdrawal of the hose 3 from the casing 1 causes the actuation of the valve construction of this invention to couple up the source of air under pressure with the hose and as soon as the tire connection is opened by the application thereof to the inner tube nipple, the compressed air flows into the inner tube to such extent as may be desired. When the required pressure is reached the operator has but to let go of the tire connection, whereupon the hose is withdrawn into the casing 1 and the valve parts are restored to their initial condition closing the valve and stopping further flow of compressed air therethrough.

While the hose reel structure and the valve connected therewith have been described as useful with air hose, it is to be understood that it may be used in connection with hose carrying other fluids than air. However it is particularly useful in connection with service stations or garages where air under pressure is customarily provided for the inflation of automobile tires.

What is claimed is:

1. A valve device for controlling the flow of fluid under pressure, including a valve member having a normal tendency to seat, and propelling means for the valve to unseat it, and a filter chamber at one side of the longitudinal center line of the valve device and communicating with the inlet of said valve device.

2. A valve device for controlling the flow of fluid under pressure, comprising a casing with two communicating chambers therein arranged side by side, one chamber having a longitudinal screen for cleansing the fluid flowing through it, and the other chamber provided with a valve seat, and an inlet and an outlet, the first-named chamber communicating with said inlet, a valve member having a normal tendency toward the seat, and means responsive to unseat the valve member and allow it to return to its seat.

3. A valve device for controlling the flow of fluid under pressure through it, comprising a casing with two communicating chambers, one chamber having a series of interior connected grooves and a screen covering the grooves, and the other chamber including spaced packing heads defining a chamber between them and one of the heads constituting a valve seat, a valve member having a normal tendency to engage the seat, and a push rod engaging the valve member and provided with ports placing the interior of the valve member in communication with the chamber between the packing heads.

4. A valve device for controlling the flow of fluid under pressure, including a chamber with packing heads therein and a spacer between the heads, thereby forming a compartment between the heads, with one of the heads constituting a valve seat, a valve member in operative relation to the valve seat and having a normal tendency to engage the valve seat, and a push rod extending through the packing heads and engaging the valve member for moving it in opposition to its normal tendency and provided with passages for placing the interior of the valve member and the compartment between the packing head in communication.

5. A valve device for controlling the flow of fluid under pressure, including a chamber with packing heads therein and a spacer separating the heads, thereby forming a compartment between the heads and one of the heads constituting a valve seat, a valve member in operative relation to the valve seat and having a normal tendency to engage said valve seat, and a push rod extending through the packing heads and engaging the valve member for moving it in opposition to its normal tendency and provided with passages for placing the interior of the valve member and the compartment between the packing heads in communication, said valve device including another chamber communicating with the first named chamber and adapted to communicate with a supply of fluid under pressure, and a screen within the last named chamber for filtering out undesirable material from the fluid under pressure.

6. A valve device for controlling the flow of fluid under pressure, including a casing having a chamber therein with packing heads, said chamber including a shoulder with which one of the packing heads engages, a hollow spacer between the packing heads to define a compartment, with said compartment having means for placing it in communication with a part to which the fluid under pressure is to be supplied, a plug for the chamber for confining the packing heads and spacer in the chamber, a valve member engaging one of the packing heads, a spring for imparting normal seating constraint to the valve member, and an operating rod for the valve member and traversing the plug and packing heads and engaging the interior of the valve member, and provided with passages for placing the interior of the valve member and the interior of the spacer into communication.

In testimony, that I claim the foregoing as my own, I have hereto affixed my signature.

JOSEPH B. McMULLIN.